(12) United States Patent
Andres et al.

(10) Patent No.: US 6,753,869 B2
(45) Date of Patent: Jun. 22, 2004

(54) CONTROLLED RESPONSIVENESS IN DISPLAY SYSTEMS

(75) Inventors: Lillian Katherine Andres, Hamilton, NJ (US); John Edmund Derzinski, Medford, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 197 days.

(21) Appl. No.: 10/014,768

(22) Filed: Dec. 11, 2001

(65) Prior Publication Data

US 2003/0107576 A1 Jun. 12, 2003

(51) Int. Cl.[7] ................................................ G09G 5/39
(52) U.S. Cl. ...................... 345/531; 345/738; 345/204
(58) Field of Search ................................ 345/204, 531, 345/738

(56) References Cited

U.S. PATENT DOCUMENTS

| | | | | |
|---|---|---|---|---|
| 4,947,346 A | * | 8/1990 | Kamiya | ........................ 345/707 |
| 5,760,789 A | * | 6/1998 | Inoue | ........................ 345/501 |
| 5,913,920 A | * | 6/1999 | Adams et al. | ............... 709/204 |
| 6,460,058 B2 | * | 10/2002 | Koppolu et al. | ............ 345/738 |

* cited by examiner

*Primary Examiner*—Matthew C. Bella
*Assistant Examiner*—Allen E. Quillen
(74) *Attorney, Agent, or Firm*—Duane Morris LLP

(57) ABSTRACT

A computer system which tends to give priority to user commands rather than to screen updates includes an event command queue (38) to which both user commands (from 14) and system screen update commands (from event controller 230) are applied. The information to be displayed is stored in a data container (226), and is accessed by a display processor (2280 in response to screen update commands from the output (38r) of the event queue (38). In order to allow user commands to have preference over system screen update commands, the event controller monitors the number of commands in the event queue, and does not issue a screen update command so long as the number of commands in the queue is greater than a predetermined or threshold number. Thus, a stream of user commands will preempt the generation of system screen updates, thereby giving preference to the user commands.

1 Claim, 3 Drawing Sheets

CONTROLLED RESPONSIVENESS IN DISPLAY SYSTEMS

FIELD OF THE INVENTION

This invention relates to computer systems, and more particularly to computer systems in which information display commands are interleaved with user commands.

BACKGROUND OF THE INVENTION

Computers are in widespread use in business, industrial, and military applications. In most or all computerized systems, a display of information to the user or users is required. The displays are conventionally in the form of ephemeral patterns termed "screens" on the face of a monitor. Those who make use of such computerized systems are well aware of many of the problems associated with the computer systems currently in use. Among those problems are difficulty of entering information, software menus which present choices which do not include the desired choice, slow response, and various errors and "unresponsiveness" hangups, often requiring rebooting.

Among the problems associated with display of information is that of delay in display of material earlier requested or commanded, with the result that the user may not be certain that a previously entered command has been accepted and recognized by the computer system. This, in turn, may lead to multiple repetitions of the same command. The application of commands while other commands remain unexecuted may, in turn, cause computer errors.

Improved computer systems are desired.

SUMMARY OF THE INVENTION

A method according to an aspect of the invention is for displaying information in a computerized system. The method comprises the steps of (a) applying data, which applied data may include information to be displayed, from a source of data to a message queue, and (b) entering user commands, and applying the user commands to an event queue (display system provider queue) in the order in which they are entered. In response to the applied data from the message queue and the user commands, at least a portion of the data from the message queue is processed to generate processed data, which processed data includes "display" information in a format suited to be processed for display. At least the "display" information in a format suited to be processed for display is stored in a data container, and at least some of the information in the data container is made available in response to a screen refresh command. That information associated with the last one or the oldest one of the screens of data which is made available from the data container is processed and currently displayed. The processing and display step is associated with a time lag. The event queue is examined to determine if a predetermined number, greater than one, of user commands exists in the queue. Periodically, (a) if more than the predetermined number of user commands do not exist in the queue, a further screen update command is issued to the input of the queue, and (b) if more than the predetermined number of user commands exist in the queue, no screen update command is issued to the input of the queue during the current period.

DESCRIPTION OF THE INVENTION

Figure 1:
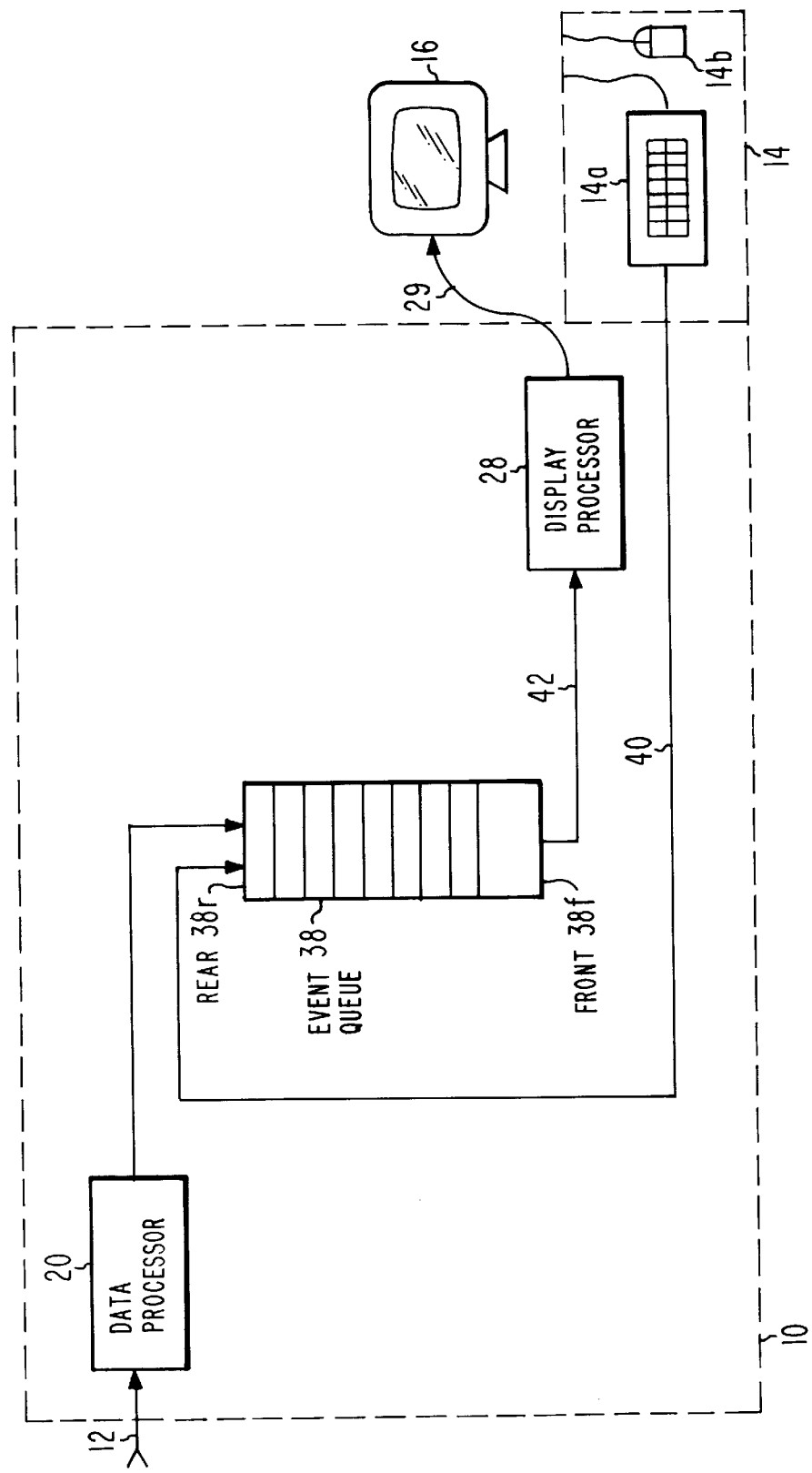
FIG. 1 is a simplified block diagram of a prior-art computer system.

In FIG. 1, a system 10 according to the prior art includes a data input port 12 for receiving data from a source 11 outside the computer system 10, or possibly from its modem, network, or hard or floppy drive. Computer system 10 also includes a monitor 16 and a user input arrangement 14 including a keyboard 14a and a mouse 14b. In the prior art, the system commands from processor 20 are applied to the input or rear end 38r of an event queue (display system provider queue) 38, together with the data for implementing the commands, or on which the commands are to act. User commands are applied by way of a path 40 from user input arrangement 14. The commands from processor 20 and user input arrangement 14 are applied nonsynchronously to the input or rear end 38r of event queue 38. Thus, the user and system commands are, in general, interspersed in the event queue. When a command arrives at the front or exit end 38f of the event queue 38, it is read by a display processor 28, which proceeds to update the displayed information on monitor 16 in accordance with the commands. A user command associated with a screen might, for example, command a magnification or "zoom" of the display, or a switching from a graphic to a text-based display. Once the system display update or user command has been executed, it is removed from the event queue.

Unfortunately, the display processor 28 of FIG. 1 may require a significant time to perform its updating task. As a result, the flow of commands through the event queue 38 may be slowed. This delay or slowing may result in the display of "stale" information, in that the latest or "newest" information (that entering the queue) cannot be displayed until the current and all intervening information is processed and displayed. The delay may also result in delay in the execution of user commands, as user commands do not reach the output or front 38f of the event queue 38 until all the intervening display commands and information have been processed.

Figure 2:
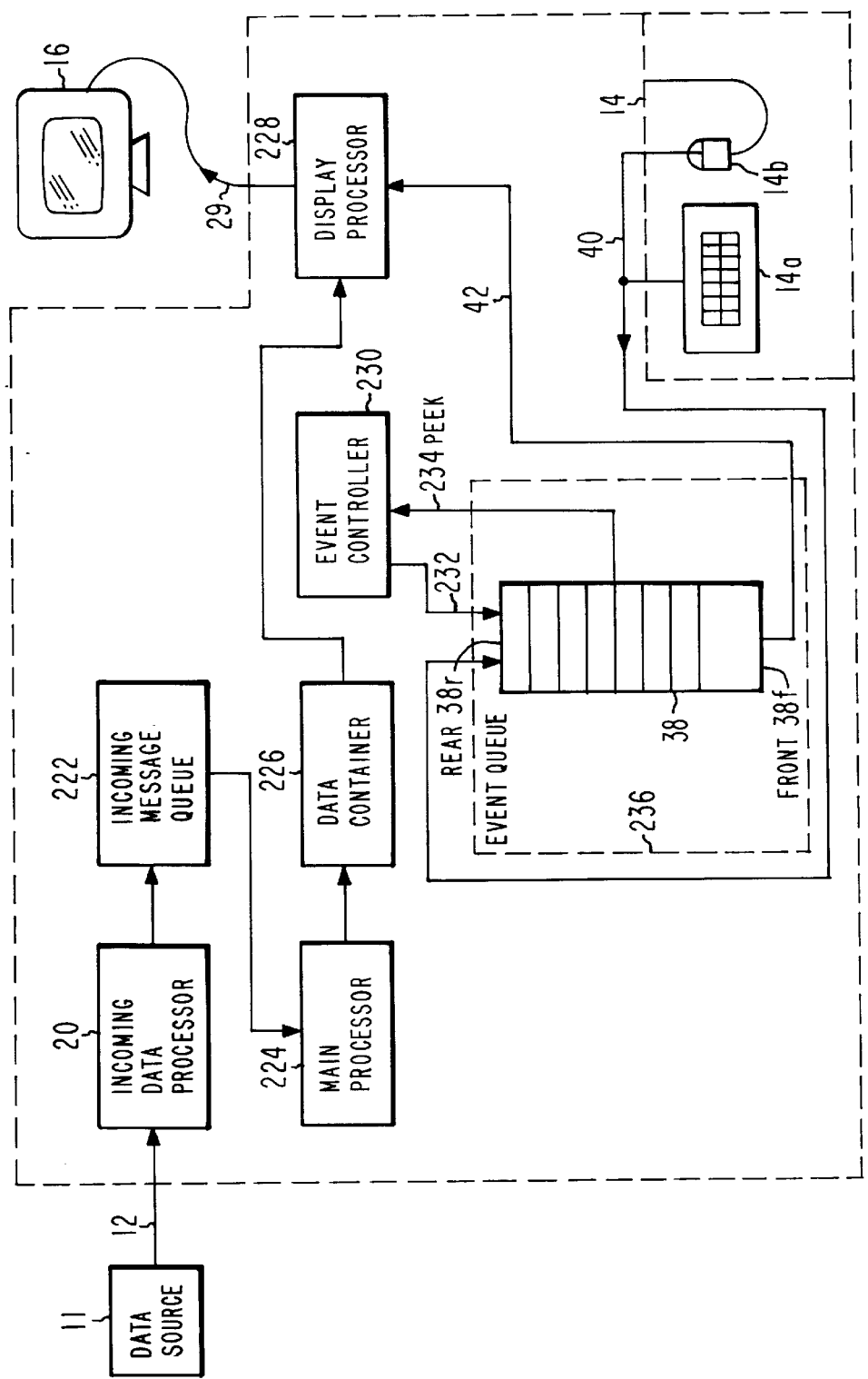
FIG. 2 is a simplified block diagram of a computer system according to an aspect of the invention, which system includes an event controller.

In FIG. 2, a system 210 according to an aspect of the invention includes a data input port 12 for receiving data from outside the computer system 210, and also includes a monitor 16 and a user data entry arrangement 14 illustrated as including a keyboard 14a and a mouse 14b. In FIG. 2, data applied to input port 12 is processed in an incoming data processor 20, as in the prior-art arrangement of FIG. 1. Processor 20 of FIG. 2 may process data from a hard or floppy disk, from a modem, internet or intranet, for accepting the data and routing it to the rear or input end of an incoming message queue 222. The main processor 224 monitors incoming message queue 222 so as to keep it from overflowing, and removes data from the rear or output end of the incoming message queue 222. Main processor 224 also performs the major portion of the processing on the data. Among the types of processing performed by main processor 224 is the processing of the data relating to information to be displayed on monitor 16, to place it in a format suitable for use by a display processor 228.

Display processor 228 of FIG. 2 reads data from a data container 226 under the control of "screen update" command signals applied by way of a signal path 42 from an event queue block 236. Display processor 228 also modifies the display as commanded by user commands applied by way of signal path 42. As illustrated in FIG. 2, queue block 236 includes an event queue 38 defining a rear or input end 38r and a front or output end 38f. An event controller illustrated as a block 230 generates screen update command signals, which are applied over a path illustrated as 232 to the rear or input end 38r of event queue 38. The screen update commands generated by event controller 230 are ordinarily generated periodically, at a rate established by the desired frame or screen refresh rate. The rear or input end 38r of event queue 38 also asynchronously receives user commands over a signal path 40 from the user input arrangement 14. Thus, the event queue 38 asynchronously receives display update commands from event controller 230 and user commands from user input arrangement 14 at its input or rear end 38r.

Display update commands and user commands are removed from the front or output end 38f of event queue 38 as the tasks with which they are associated are completed. In the case of display updates, the commands flow from the front end 38f of event queue 38 to display processor 228 by way of path 42. In response to the display update command, the display processor 228 reads the screen or frame data currently stored in data container 226, and processes the data for application to monitor or display 16. It should be noted that the data on which display processor 228 operates is derived from data container 226, and only the commands themselves flow through the event queue 38. Thus, when a screen is updated, only the most recent information is used, and stale information is not displayed. The processing of the information to be displayed by display processor 228 may be subject to time delay due to the heavy processing requirements of complex video.

According to an aspect of the invention, the event controller 230 of FIG. 2 monitors the contents of the event queue 38, as suggested by the read-only "Peek" line designated as 234. By monitoring the queue, the sequence of event-controller-issued commands and user-issued commands can be determined. According to an aspect of the invention, the display update commands are not generated by event controller 30, or if generated are not applied to the event queue 38, whenever a sequence of two or more user commands have been entered into the event queue 38 since the last or previous event-controller-initiated screen update command. The particular number of user commands may be preselected to be two, or three, or any larger number. The number may be updated on-line or on-the-fly, if desired. The same effect can be achieved by simply monitoring the number of commands in the event queue 38, and not issuing system screen update commands from the event controller 230 to the event queue 38 during those times in which the event queue 38 contains more than the specified or threshold number of commands.

Figure 3:
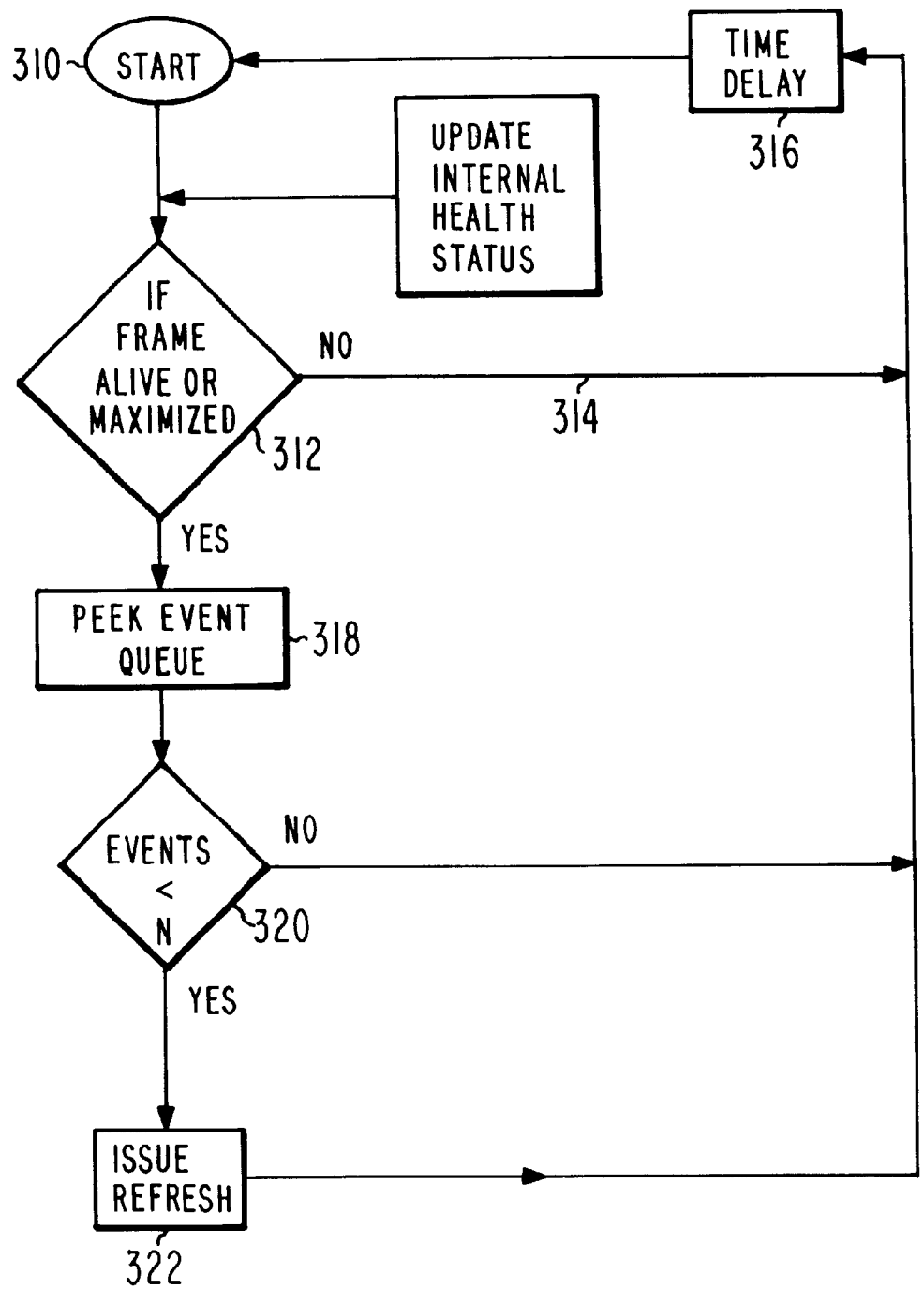
FIG. 3 is a simplified logic flow chart illustrating the operation of the event controller of FIG. 2.

FIG. 3 is a simplified logic flow chart or graph illustrating a logic flow which may be used in the event controller 230 of FIG. 2. In FIG. 3, the logic periodically begins operation at a START block 310, and flows to a decision block 312. Decision block 312 determines if the currently displayed frame is "alive" or is not an icon (that is, the screen has a finite or nonzero dimension). If the frame is being displayed as an icon, there is no reason to update the information therein, and the logic leaves decision block 312 by the NO output, and proceeds by way of a return path and time delay 316 to the START block 310. In this arrangement, the periodicity with which the logic restarts is determined principally by the time delay of delay block 316.

If the screen currently being displayed is not an icon, but instead has finite dimensions, or is maximized, the logic leaves decision block 312 of FIG. 3 by the YES output, and flows to a block 318, which represents "peeking" at, or examining the data in, the event queue 38 of FIG. 2. From block 318 of FIG. 3, the logic flows to a further decision block 320, which determines the number of commands in the queue. If the number exceeds the allowable number, which may for example be N, then the logic leaves decision block 320 by the NO output, and returns by way of path 314 and delay 316 to the START block 310, without issuing another system update command. If the number of commands in the queue is less than N, then the logic leaves decision block 320 by the YES output, and arrives at a block 322. Block 322 represents the issuance to the input or rear end 38r of event queue 38 of a system update command.

In operation of a system according to this aspect of the invention, the issuance of system update commands from the output or front of event queue 38 occurs at a rate which is the same rate at which the commands can be executed by the display processor. Assuming that the allowable number N of commands is three, and the event queue contains three (or more) commands, at the next periodic operation of the logic of FIG. 3, no system update command will issue from event controller 230, and the queue will not grow longer. Even if there are no system display update commands within the queue, but the queue contains three or more user commands, no system display update command will issue. This gives the system a chance to operate on the user commands without attempting to update the display between successive user commands, and keeps the queue short. Processing priority is thus given to user commands, and they are likely to be executed with less delay occasioned by processing directed toward screen updates. By comparison with the prior-art arrangement of FIG. 1, the data currently being displayed is more likely to be recent or "new" data, since only the display update command, and not the data itself, runs through the event queue. A display update command arriving at the output or front end of the queue results in retrieval of current data for display.

In effect, the data or signals entering the computer or other processing device is asynchronously processed, so that display requests included within the input data can be throttled to a rate lower than the rate at which they would otherwise be displayed, to thereby update the display, at an eye-pleasing rate, with fresh information. Additionally, user input data or signals are considered in deciding whether such display requests should issue to the display processor, so as to give the user a higher priority.

Thus, in general, a computer system according to the invention tends to give priority to user commands rather than to screen updates includes an event command queue (38) to which both user commands (from 14) and system screen update commands (from event controller 230) are applied. The information to be displayed is stored in a data container (226), and is accessed by a display processor (228) in response to screen update commands from the output (38r) of the event queue (38). In this context, the "event queue" corresponds to a display processor provider queue. In order to allow user commands to have preference over system screen update commands, the event controller monitors the number of commands in the event queue, and does not issue a screen update command so long as the number of commands in the queue is greater than a predetermined or threshold number. Thus, a stream of user commands will preempt the generation of system screen updates, thereby giving preference to the user commands.

More specifically, a method according to an aspect of the invention is for displaying information in a computerized system (10). The method comprises the steps of (a) applying data, which applied data may include information to be displayed, from a source (11) of data to a message queue (222), and (b) entering user commands (at 14), and applying the user commands to an event queue (38) in the order in which they are entered. In response to the applied data from the message queue (222) and the user commands, at least a portion of the data from the message queue is processed (224) to generate processed data, which processed data includes "display" information in a format suited to be processed for display. At least the "display" information in a format suited to be processed for display is stored in a data container (226), and at least some of the information in the data container (226) is made available in response to a screen refresh command. That information associated with the last one (the oldest one) of the screens of data which is made available from the data container (226) is processed (by display processor 228) and currently displayed (on monitor 16). The processing and display step is associated with a time lag. The event queue (38) is examined to determine if a predetermined number, greater than one (three in the example), of user commands has exists in the queue. Periodically, (a) if more than the predetermined number of user commands do not exist in the queue, a further screen update command is issued to the input of the queue, and (b) if more than the predetermined number of user commands exist in the queue, no screen update command is issued to the input of the queue during the current period.

What is claimed is:

1. A method for displaying information in a computerized system, said method comprising the steps of;

applying data, which applied data may include information to be displayed, from a source of data to a message queue;

entering user commands, and applying said user commands to an event queue in the order in which they are generated;

in response to said applied data and any of said user commands reaching the end of said event queue, processing at least a portion of said data to generate processed data, including information in a format suited to be processed for display;

storing, in a data container, at least a portion of said information in a format suited to be processed for display, to thereby generate stored data for display;

in response to a screen refresh command from said output of said event queue, making available from said data container that portion of said stored data for display which is associated with the oldest video frame;

processing and currently displaying that stored data from said data container which is made available in response to said screen refresh command, said processing and currently displaying being associated with a time lag;

examining said event queue to determine the number of commands which exists in said event queue;

periodically, (a) if the number of commands which exists in said event queue does not exceed a predetermined number, applying a further screen update command to said input of said queue during the current period, and (b) if said number of commands which exists in said event queue exceeds said predetermined number, not applying a further screen update command to said input of said event queue during the current period.

\* \* \* \* \*